Sept. 18, 1923.
A. WASSEL
WINDSHIELD WING
Filed June 17, 1922
1,468,182
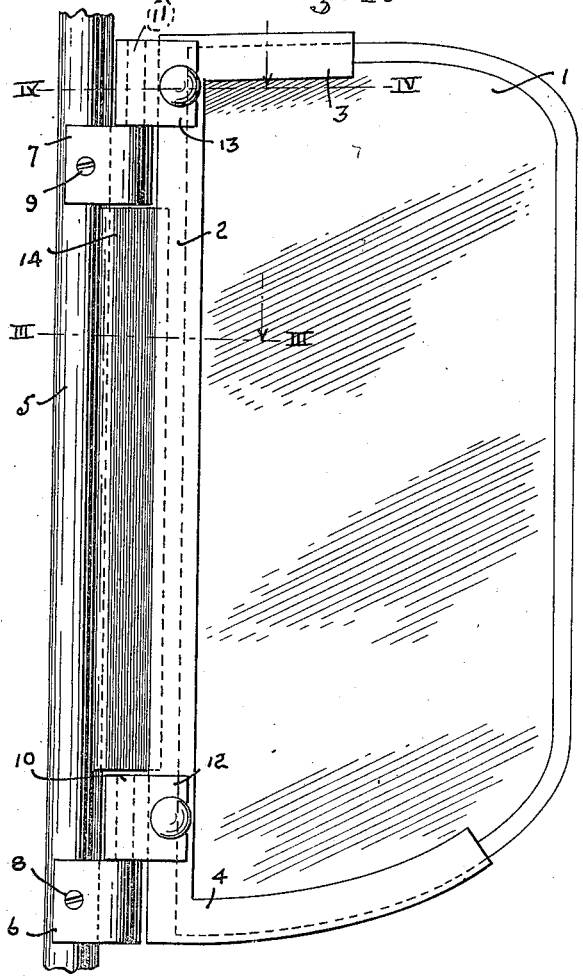
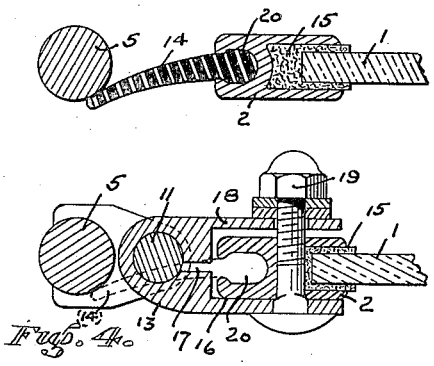
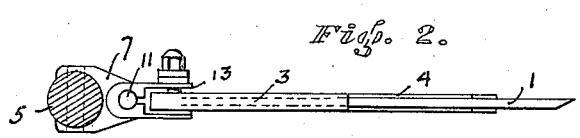
INVENTOR.
Albert Wassel
BY
Miller Henry & Boyken
ATTORNEY.

Patented Sept. 18, 1923.

1,468,182

UNITED STATES PATENT OFFICE.

ALBERT WASSEL, OF SAN FRANCISCO, CALIFORNIA.

WINDSHIELD WING.

Application filed June 17, 1922. Serial No. 569,010.

*To all whom it may concern:*

Be it known that I, ALBERT WASSEL, a citizen of the United States, and resident of the city and county of San Francisco, State of California, have invented new and useful Improvements in Windshield Wings, of which the following is a specification.

My invention has for its object a side wing adapted to be placed on one or both sides of an automobile wind shield to protect the occupants thereof from drafts and air currents passing around the edge of the wind shield.

The principal object of my invention is to provide a wing which may be readily swung into any desired position by one hand of the occupant without the manipulation of any adjusting or tightening mechanism during said operation and one that will remain thereafter fixed in said adjusted position.

Another object is a wing which in combination with the stationary elements of the wind shield will at all times provide a closure against any air currents passing therebetween.

Another object is a wing which when mounted upon an automobile will prevent rain, sand, etc., from passing between the wind shield and the wing and thus discomforting the occupants.

Another object is a wing which is at all times frictionally retained in the position into which it may be moved at will by the operator and without coming loose or being disturbed therefrom until again adjusted.

A further object is a wing of the character described wherein integral frame portions embrace one edge and part of the two ends of the wing, and is suitably shaped and recessed to receive the glass wing therein without bolts or screws and to at all times hold the said glass rigidly in the said frame against rattling or displacement.

Other objects will appear from the drawings and specifications which follow:

Fig. 1 is a front view of the wing of my invention shown as attached to one side of the stationary portion of a wind shield forming part of any conventional vehicle, the other parts of which are well known but not shown.

Fig. 2 is a plan view of Fig. 1.

Fig. 3 is a detail cross section of Fig. 1 on the line III—III thereof.

Fig. 4 is a cross section of a portion of Fig. 1 on the line IV—IV thereof.

Fig. 5 shows a variation in the manner of connecting my wind shield to the stationary parts of the wind shield frame.

Throughout the figures similar numerals refer to identical parts.

My wing comprises a glass portion indicated by the numeral 1 the edges of which may be suitably beveled and which is mounted in a frame, the upright side of which is indicated by the numeral 2, from which extend the top 3, and bottom 4. A stationary portion as the vertical frame of a vehicle conventional wind shield is shown at 5. Mounted upon this vertical member 5 is a lower pintle bracket 6 and upper pintle bracket 7, and these are suitably attached thereto as by screws 8, 9, and have pintles 10, 11, extending therefrom and engaging the hinge members 12, 13, respectively. These hinge members 12 and 13 and the pintles 10 and 11 are preferably formed of bronze or other non-corrodible metal so that they will at all times be maintained operable under weather conditions; that is, the parts will not rust or freeze together. At 14 is a weather strip made of rubber or other flexible material secured in a recess at 20 in the frame member 2 and covering the space between the said frame member and the wind shield column 5. The hinge members are preferably made integral with or welded or otherwise securely fixed on one side to the frame member 2 as best shown at 16 in Fig. 4 wherein the packing strip of felt or the like is shown at 15 around the glass 1 and within the frame member 2. The hinge blocks 12 and 13 are welded at 16 to the frame 2 and each has an opening 17 through to the pintle opening as 11 and each has its opposite side at 18 left free from the frame 2 so that by drawing together the two sides as with the screw and nut 19 the pintle is gripped more or less tightly by the hinge block; and which will now be frictionally held with any degree of rigidity desired, and the frame 2, 3, 4, and glass 1 being integral with the said hinge blocks, is thus prevented from any rattling or independent movement up to the limit of the said frictional grip of the hinge blocks 12, 13. At 20 is shown an undercut recess into which the rubber strip 14 having a beaded edge corresponding with the said recess is cemented, thus the said flexible strip 14 which contacts with the wind shield column 5 at all times preventing wind, rain, etc., from entering between the said joint. In Fig. 5 is shown a different manner of mounting the pintles wherein the column 5 is provided with a thread and nut on the bottom and top and a main support from the body of the vehicle at 21 in which case my wind shield wing may be readily fitted by employing the brackets 22, 23, which may then be held in place by the nuts 24, 25, respectively, on the said rod 5. In this latter case the top pintle may project downward instead of upward as shown in Fig. 1 and the rubber weather strip 14 in any event I prefer to extend over the hollow space between the blocks 12, 13. It will now be seen that my wing provides in effect a frictionally held adjustable wind shield wing as an extension of and adjacent to the main wind shield glass shown at 26. The joint between the two being sealed against the weather by the weather strip 14.

I claim:

1. A wind shield wing comprising a glass member, a channel frame adapted to embrace substantially half of the periphery of said glass member, a split hinge one portion of which is fixed to said frame on one side and the other portion normally clear of said frame, clamp means by which said portions are compressed about a pintle, a pintle adapted to be supported from the vehicle, and a weather strip positioned between the said frame and a stationary part of said vehicle.

2. An adjustable wind shield wing comprising a glass member and a frame embracing said member over substantially half of its periphery, a plurality of two part hinges, one part adapted to be fixed to a stationary part of a vehicle and the other part split into two parallel leaves, said frame fixed to one of the leaves and positioned between the leaves, and screw means engaging the other leaf and the frame to clamp the hinge parts in frictional relation.

ALBERT WASSEL.